United States Patent [19]

Tokunaga et al.

[11] Patent Number: 4,581,283
[45] Date of Patent: Apr. 8, 1986

[54] HEAT-SENSITIVE MAGNETIC TRANSFER ELEMENT

[75] Inventors: Yukio Tokunaga; Yasuhisa Ikeda, both of Yokosuka; Tadao Seto, Odawara; Yoshikazu Shimazaki, Osaka, all of Japan

[73] Assignees: Nippon Telegraph & Telephone Public Corporation, Tokyo; Fuji Kagakushi Kogyo Co., Ltd., Osaka, both of Japan

[21] Appl. No.: 611,439

[22] Filed: May 17, 1984

Related U.S. Application Data

[63] Continuation-in-part of Ser. No. 358,033, Mar. 15, 1982, Pat. No. 4,463,034.

[30] Foreign Application Priority Data

Apr. 21, 1981 [JP] Japan .................................. 56-60961

[51] Int. Cl.$^4$ .............................................. B41M 5/26
[52] U.S. Cl. .................................... 428/216; 400/241; 400/241.1; 427/48; 427/128; 428/206; 428/329; 428/484; 428/488.1; 428/500; 428/521; 428/522; 428/523; 428/692; 428/900; 428/913; 428/914

[58] Field of Search ...................... 360/1, 2, 131, 134; 400/241, 241.1; 401/1, 52; 427/48, 128, 130, 197, 199, 256; 428/206-209, 212, 213, 215, 216, 323, 328, 329, 488.1, 488.4, 692, 694, 900, 913, 914, 484, 500, 521-523

[56] References Cited

U.S. PATENT DOCUMENTS

| 3,284,360 | 11/1966 | Peshin | 428/900 |
| 3,375,125 | 3/1968 | Shenian | 428/327 |
| 3,496,015 | 2/1970 | Newman et al. | 428/914 |
| 3,663,278 | 5/1972 | Blose et al. | 117/234 |

FOREIGN PATENT DOCUMENTS 56-60961 4/1981 Japan .................................. 428/900

Primary Examiner—Bruce H. Hess
Attorney, Agent, or Firm—Armstrong, Nikaido, Marmelstein & Kubovcik

[57] ABSTRACT

Heat-sensitive magnetic transfer element for printing magnetic image to be recognized by magnetic ink character reader (MICR), which comprises a heat-resisting foundation and a heat-sensitive transferring layer provided on the foundation, said transferring layer having a melting temperature of 50° to 120° C. and comprising 30 to 97% by weight of a ferromagnetic substance powder, 2 to 69% by weight of a wax and 1 to 68% by weight of a resin. The transfer element gives a printed magnetic image having high accuracy of dimensions and high magnetic properties by thermal printing method.

5 Claims, 2 Drawing Figures

HEAT-SENSITIVE MAGNETIC TRANSFER ELEMENT

CROSS-REFERENCE TO RELATED APPLICATION

This is a continuation-in-part of application Ser. No. 358,033 filed on Mar. 15, 1982, now U.S. Pat. No. 4,463,034.

BACKGROUND OF THE INVENTION

The present invention relates to a heat-sensitive magnetic transfer element and more particularly to a heat-sensitive magnetic transfer element which allows a thermal printer to prepare a printed magnetic image recognized by a magnetic ink character reader.

The magnetic ink character reader (hereinafter referred to as MICR) can read and recognize the certain printed magnetic image, such as character, or mark, which is printed to bill, check, credit card, pass, traffic census card, or the like. A magnetic head in the MICR converts the variations of magnetic portions corresponding to various characters and marks into predetermined signals, and voltages are detected to recognize the characters and marks.

In that case, it is necessary that each of the characters and marks to be read by the magnetic head has a certain shape, dimensions and allowable ranges of dimensions in addition to the certain magnetic signal levels. Therefore, the allowable ranges as to E13B type face employed in American Bank Association are defined in JIS C 6251 (Japanese Industrial Standard).

E13B type face defined in JIS C 6251 consists of 10 numbers (0 to 9) and 4 special marks. According to JIS C 6251, a character height, a character width, a corner radius, allowable ranges of those and an allowable range of a void with respect to each character are described. In addition to E13B type face, CMC7 type face is well known as type face for MICR. CMC7 type face is formed by arranging 7 longitudinal bars with 2 kinds of intervals, and each of CMC7 type faces can be magnetically recognized by combinations of 2 kinds of intervals. Thus, CMC7 type faces consist of 10 numbers, 26 large alphabets and 5 special marks, and dimensions and magnetic property of CMC7 type face are determined by European Computer Manufactures Association.

The printed image of the above type face for MICR is formed by transferring a magnetic ink into a receiving paper by an impact printer such as typewriter. The magnetic ink including a magnetic substance powder is coated and dried on a foundation such as plastic film to form a pressure-sensitive magnetic transfer element. Such a pressure-sensitive magnetic transfer element is disclosed in, for example, Japanese Patent Publication No. 21449/1970.

However, the use of the pressure-sensitive magnetic transfer element results in generating noise due to impact system and further cannot perform high printing speed. In addition, the above transfer element tends to generate voids in the printed magnetic image.

OBJECTS OF THE INVENTION

A main object of the invention is to provide a heat-sensitive magnetic transfer element which can easily produce a printed magnetic image by thermal printing method with high printing speed without generating noise.

Another object of the invention is to provide a heat-sensitive magnetic transfer element from which a printed magnetic image having high accuracy of dimensions and high magnetic properties can be produced by thermal printing method.

Other objects and advantages of the invention will become apparent from the following descriptions with reference to the accompanying drawings.

DETAILED DESCRIPTION OF THE INVENTION

The present invention provides a heat-sensitive magnetic transfer element for printing a magnetic image which comprises a heat-resisting foundation and a heat-sensitive transferring layer provided on the foundation, said transferring layer having a melting temperature of 50° to 120° C. and comprising 30 to 97% by weight of a ferromagentic substance powder, 2 to 69% by weight of a wax and 1 to 68% by weight of a resin.

The above-mentioned melting temperature of the transferring layer is measured at a heating-up velocity of 40° C./min. by Meihosha-type melting point measuring device available from Meihosha Factory Ltd.

The heat-sensitive transfer element of the present invention gives a printed magnetic image on a receiving medium by thermal printing method. Therefore, the printing speed is high and no noise is generated, differing from the conventional pressure-sensitive magnetic transfer element.

Further, in the present invention, the specific binder material composed of a wax and a resin as mentioned above is used. The use of the specific binder assures good melt-transfer property of the transferring layer, nevertheless the a high content of the ferromagnetic substance powder. In the magnetic transfer element, high content of the ferromagnetic substance powder is desirable, since the printed magnetic image can be read accurately with increasing magnetic flux density. Thus, the heat-sensitive magnetic transfer element of the present invention gives sharp images having high magnetic flux density, good edge definition and free from voids. The obtained printed magnetic images having high accuracy of dimentions and high magentic properties can be accurately read and recognized by MICR.

Figure 1:
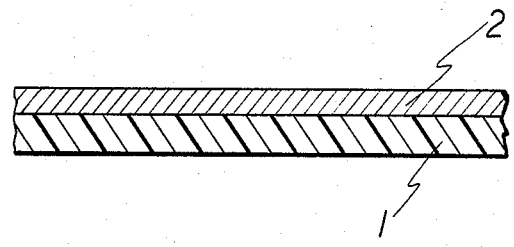
FIG. 1 is a schematical sectional view for showing an embodiment of a heat-sensitive magnetic transfer element of the invention.

Referring to FIG. 1, a heat-sensitive magnetic transfer element according to the present invention consists of a heat-resisting foundation 1, and a heat-sensitive transferring layer 2 containing a ferromagnetic substance powder and having a melting temperature of 50° to 120° C.

The heat-sensitive transferring layer 2 is formed by uniformly admixing a wax and a resin as a binder material, and if necessary, additives such as fat or oil, extender pigment, or dispersant, with a magnetic substance powder and applying the resultant composition onto the foundation 1 by means of hot-melt coating or solvent coating.

The magnetic substance powder is contained in the heat-sensitive transferring layer 2 in an amount of from 30 to 97% by weight, preferably from 40 to 90% by weight, more preferably from 50 to 90% by weight, per total amount of the transferring layer 2. When the magnetic substance powder content is less than the above range, the magnetic properties of the printed image are lowered, which results in the difficulty of reading by MICR. On the other hand, when the magnetic substance powder content is more than the above range, the melt-transfer property of the transferring layer 2 and the adhesion strength of the printed image against the image receiving paper are lowered.

In the case that the heat-sensitive transferring layer 2 is provided on the heat-resisting foundation 1 by means of hot-melt coating, the heat-sensitive transferring layer 2 preferably contains 40 to 85% by weight of a ferromagnetic substance powder, 10 to 59% by weight of a wax, 1 to 20% by weight of a resin, 0 to 30% by weight of a fat or oil, 0 to 30% by weight of an extender pigment and 0 to 2% by weight of a dispersant, in order to obtain a uniform transferring layer having good magnetic property and transfer property.

In the case that the heat-senstive transferring layer 2 is provided on the heat-resisting foundation 1 by means of solvent coating, the heat-sensitive transferring layer 2 preferably contains 50 to 90% by weight of a ferromagnetic substance powder, 2 to 30% by weight of a wax, 8 to 48% by weight of a resin, 0 to 30% by weight of a fat or oil, 0 to 30% by weight of an extender pigment and 0 to 2% by weight of a dispersant, in order to obtain a uniform transferring layer having good magnetic property and transfer property. The above components are dissolved or homogeneously dispersed in an organic solvent and the resulting mixture is applied onto the foundation 1 and dried to give a transferring layer. Examples of the solvent used are toluene, methyl ethyl ketone, methyl isobutyl ketone, cyclohexane, butyl butyrate, dioxane, and ethylbenzene.

Examples of the ferromagnetic substance powder are $\gamma$-$Fe_2O_3$, $\gamma$-$Fe_2O_3$ containing Co, $Fe_3O_4$, $Fe_3O_4$ containing Co, $CrO_2$, Co-Cr alloy, Co-Fe alloy, Co-Ni-P alloy, Co-Ni-Fe alloy, Co-Ni-Fe-B alloy, Co-Ni-Zn alloy, Fe-Mn-Zn alloy, Fe-Co-Ni-Cr alloy, Fe-Co-Ni-P alloy, Ni-Co alloy, and the like. The aspect ratio (L/D) of the ferromagnetic substance powder mentioned above is preferably from 5:1 to 20:1, more preferably from 5:1 to 10:1, and the diameter of the same is preferably from 0.01 to 1$\mu$, more preferably from 0.02 to 0.5$\mu$. Furthermore, the length of the ferromagnetic substance powder is preferably from 0.05 to 20$\mu$, more preferably from 0.1 to 5$\mu$.

In the present invention, a solid wax having a melting point of 50° to 120° C. is preferably used as a wax. Examples of the solid wax are carnauba wax, montan wax, paraffin wax, microcystalline wax, bees wax, and the like.

A thermoplastic resin or elastomer is preferably used as a resin. Examples of the thermoplastic resin are polyvinyl chloride, polyvinyl acetate, vinyl chloride-vinyl acetate copolymer, polyethylene, polypropylene, polyacetal, ethylene-vinyl acetate copolymer, polystyrene, low molecular weight styrene resin, polyacrylic ester, polyvinyl butyral, polyamide, ethyl cellulose, and the like. Furthermore, petroleum resin, rosin or the derivative thereof, cumarone-indene resin, terpene resin, polyurethane, synthetic rubber such as styrene-butadiene rubber, nitrile rubber, polyacrylate rubber, ethylene-propylene rubber, or the like can be also preferably employed. Epoxy resin, xylene resin or ketone resin can be employed. Those resins are used alone or in admixture. Ethylene-vinyl acetate copolymer, low molecualr weight styrene resin and low molecular weight styrene-butadiene rubber are employed most preferably.

Since the wax and the resin are used in combination as a binder material, the melt-transfer property of the transferring layer 2 obtained can be effectively improved. Thus, the transferred magnetic image 5 is free from voids and breaks, and further has an excellent adhesion against the reveiving paper 3.

Examples of the above fat and oil are animal oil, vegetable oil, mineral oil, dioctyl phthalate, tricresyl phosphate, dibutyl phthalate and the like.

Examples of the above extender pigment are calcium carbonate, magnesium carbonate, diatomaceous earth, kaolin, white carbon, silicic acid powder, and the like. Examples of the dispersant are nonionic surface active agents such as di(polyoxyethylene alkylether) phosphate, tri(polyoxyethylene alkylether) phosphate, polyoxyethylene stearylamine, polyoxyethylene laurylether, polyoxyethylene oleylether, polyoxyethylene cetylether, polyoxyethylene stearylarylether, and the like.

The heat-sensitive transferring layer 2 thus obtained has preferably a thickness of 2 to 25$\mu$, and the heat-resisting foundation 1 has preferably a thickness of 3 to 40$\mu$.

Examples of the heat-resisting foundation 1 are plastic films such as polyester, polycarbonate, nylon and polypropylene; papers such as condenser paper and glassine paper; and moisture-protectd cellophane.

Figure 2:
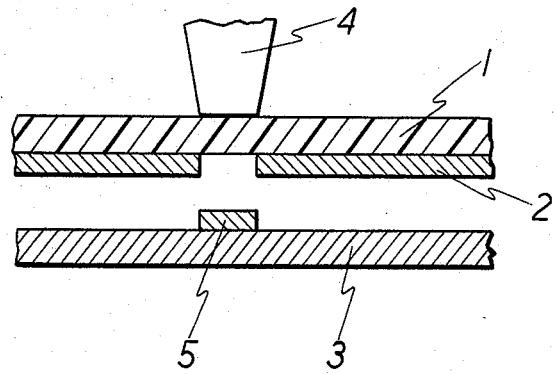
FIG. 2 is an explanatory view for showing a printing method using a heat-sensitive magnetic transfer element of the invention.

The heat-sensitive magnetic transfer element of the invention is overlapped with the receiving paper 3 such as a check, and then is printed by a thermal head 4 of the thermal printer as shown in FIG. 2, whereby the magnetic image 5 is melt-transferred on the receiving paper 3.

In that case, the heat-sensitive transferring layer 2 according to the invention can be correctly transferred only in the portion of the transferring layer 2 corresponding to the heating and printing portion of the thermal head 4, because the heat-sensitive transferring layer 2 has a melting temperature of 50° to 120° C. and is superior in the heat-transfer property and the adhesion property. As a result, the magnetic image prepared has a very sharp profile without causing the void, the break of the character and the smudge of the receiving paper 3.

In particular, the magnetic image 5 thus obtained has a high accuracy in dimension to ensure the reading operation of MICR so that a high reliability can be offered.

In addition, the invention has also significant advantages that a high-speed printing can be preformed without generating noise, and the preparation of a bill, check, credit card, pass, traffic census card, or the like can be readily and rapidly carried out, since the magnetic image 5 is prepared by using the thermal printer.

Further, the magnetic image obtained in the invention is not limited to only the certain type face such as E13B or CMC7 mentioned above, and other certain characters are also readily prepared from the heat-sensitive magnetic transfer element by means of the thermal printer.

The present invention is more particularly described and explained by means of the following Examples. These Examples are intended to illustrate the invention and not be construed to limit the scope of the invention. It is to be understood that various changes and modifications may be made in the invention without departing from the spirit and scope thereof.

EXAMPLE 1

A composition of heat-sensitive transferring layer described below was uniformly admixed and was applied on a polyester film having a thickness of 6μ by means of hot-melt coating to obtain a heat-sensitive transferring layer having a melting temperature of 68° C. and a thickness of 6μ.

| Ingredients | Parts by Weight |
|---|---|
| γ-Fe$_2$O$_3$<br>Coercive force: 1200 Oe<br>Diameter: 0.4μ<br>Length: 1μ | 200 |
| Carnauba wax | 15 |
| Paraffin wax<br>(melting point: 68° C.) | 32 |
| Ethylene-vinyl acetate copolymer | 3 |
| Vaseline | 5 |

The magnetic transfer element thus obtained was overlapped with a fine paper, and then was printed by thermal printer commercially available from Oki Electirc Industry Co., Ltd. under "Thermal Printer 200" at a printing speed of 30 characters per second so that the heat-sensitive transferring layer is melted and transferred on the fine paper to form magnetic images.

EXAMPLE 2

A composition of heat-sensitive transferring layer described below was uniformly admixed, and then was applied on a condenser tissue and dried to obtain a heat-sensitive transferring layer having a melting temperature of 90° C. and a thickness of 8μ.

| Ingredients | Parts by Weight |
|---|---|
| Fe$_3$O$_4$<br>Coercive force: 1100 Oe<br>Diameter: 0.2μ<br>Length: 0.5μ | 68 |
| Solprene T<br>(low molecular weight block copolymer of styrene and butadiene available from Asahi Chemical Industry Co., Ltd.) | 4.5 |
| Arkon P-90<br>(saturated alicyclic petroleum resin available from Arakawa Kagaku Kogyo Kabushiki Kaisha) | 8.0 |
| Hoechst wax V<br>(Hoechst AG) | 2.5 |
| Toluene | 50 |
| Solvent naphtha<br>(boiling point: 125° C.) | 25 |

The magnetic transfer element thus obtained was overlapped with a check paper, and then was printed by the same thermal printer as in Example 1 at a printing speed of 30 characters per second to melt and transfer the heat-sensitive transferring layer in the form of magentic images on the paper.

As a result, dimensions of each magnetic image prepared in Examples 1 and 2 (character height, character width and line width) fell within the allowable ranges defined in JIS C 6251.

Also, voids existing in the magnetic images were determined by observing whether single void was included within a square gauge of 0.203 mm.×0.203 mm. In that case, the void existing in a line having a width of 0.660 mm. or more was determined by employing a square gauge of 0.254 mm.×0.254 mm. according to the definition of JIS C 6251. The results are shown in the following Table.

Furthermore, magnetic properties (coercive force, residual magnetic flux density and relative signal level) of each magnetic image prepared in Examples 1 and 2 are also shown in the same Table.

In that case, the relative signal level is determined by measuring a signal level with a MICR tester (commercially available from Kidder Press Company Inc. under "Kidder Magnetic Character Tester") defined in JIS C 6251, and then calculating a percentage of the measured signal level against the standard signal level with reference to the same character. The relative signal level must be within a range of 50 to 200% against the standard signal level of the examined character.

TABLE

| | | | Magnetic properties | |
|---|---|---|---|---|
| | Voids | Coercive force (Oe) | Residual magnetic flux density (G) | Relative Signal level (%) |
| Ex. 1 | none | 340 | 1700 | 110 |
| Ex. 2 | none | 330 | 1850 | 105 |

In addition to the elements or ingredients used in the Examples, other elements or ingredients can be used in the Examples as set forth in the specification to obtain substantially the same results.

Variations and modifications will be apparent to a person skilled in the art in the light of the present disclosure and within the scope of the present claims.

What we claim is:

1. A heat-sensitive magnetic transfer element for printing a magnetic image which comprises a heat-resisting foundation and a heat-sensitive transferring layer provided on the foundation, said transferring layer having a melting temperature of 50° to 120° C. and comprising 30 to 97% by weight of a ferromagnetic substance powder, 2 to 69% by weight of a wax and 1 to 68% by weight of a thermoplastic elastomer.

2. The transfer element of claim 1, wherein the transferring layer is one formed by hot-melt coating and comprising 40 to 85% by weight of the ferromagnetic substance powder, 10 to 59% by weight of the wax and 1 to 20% of the thermoplastic elastomer.

3. The transfer element of claim 1, wherein the transferring layer is one formed by solvent coating and comprising 50 to 90% by weight of the ferromagnetic substance powder, 2 to 30% by weight of the wax and 8 to 48% by weight of the thermoplastic elastomer.

4. The transfer element of claim 1, wherein the thermoplastic elastomer is a member selected from the group consisting of a styrene-butadiene copolymer, a butadiene-acrylonitrile copolymer, a polyacrylate elastomer and and ethylene-propylene copolymer.

5. The transfer element of claim 1, wherein the thickness of the foundation is from 3 to 40μ, and that of the transferring layer is from 2 to 25μ.

* * * * *

UNITED STATES PATENT AND TRADEMARK OFFICE
CERTIFICATE OF CORRECTION

PATENT NO. : 4,581,283
DATED : April 8, 1986
INVENTOR(S) : Yukio TOKUNAGA et al It is certified that error appears in the above-identified patent and that said Letters Patent is hereby corrected as shown below:

Claim 2, line 5, "1 to 20%" should read --1 to 20% by weight--.

Claim 4, line 5, "and and" should read --and an--.

Signed and Sealed this

Fifth Day of August 1986

[SEAL]

Attest:

DONALD J. QUIGG

Attesting Officer    Commissioner of Patents and Trademarks